United States Patent [19]

Christy, Sr. et al.

[11] Patent Number: 5,229,011
[45] Date of Patent: * Jul. 20, 1993

[54] PROCESS FOR PATHOGEN REDUCTION IN WASTE

[76] Inventors: Robert W. Christy, Sr., 224 Hedgemere Dr.; Paul G. Christy, 303 Devonshire Rd., both of Devon, Pa. 19333

[*] Notice: The portion of the term of this patent subsequent to May 7, 2008 has been disclaimed.

[21] Appl. No.: 970,915

[22] Filed: Nov. 3, 1992

Related U.S. Application Data

[63] Continuation-in-part of Ser. No. 654,789, Feb. 13, 1991, which is a continuation of Ser. No. 505,938, Apr. 6, 1990, Pat. No. 5,013,458.

[51] Int. Cl.$^5$ ............................................. C02F 11/14
[52] U.S. Cl. ................................. 210/751; 210/764; 210/916
[58] Field of Search ............... 210/751, 742, 743, 764, 210/916

[56] References Cited

U.S. PATENT DOCUMENTS

| | | | |
|---|---|---|---|
| 2,723,954 | 11/1955 | Young | 34/9 |
| 3,793,841 | 2/1974 | Dozsa | 405/263 |
| 4,028,240 | 6/1977 | Manchak, Jr. | 588/252 |
| 4,118,248 | 10/1978 | Sandesara | 588/256 |
| 4,270,279 | 6/1981 | Roediger | 34/9 |
| 4,295,972 | 10/1981 | Kamei | 210/710 |
| 4,306,978 | 12/1981 | Wurtz | 210/738 |
| 4,369,111 | 1/1983 | Roediger | 210/199 |
| 4,460,470 | 7/1984 | Reimann | 210/605 |
| 4,514,307 | 4/1985 | Chestnut et al. | 588/200 |
| 4,541,986 | 9/1985 | Schwab et al. | 210/754 |
| 4,597,872 | 7/1986 | Andersson et al. | 210/605 |
| 4,614,587 | 9/1986 | Andersson et al. | 210/603 |
| 4,632,759 | 12/1986 | Andersoon et al. | 210/603 |
| 4,659,471 | 4/1987 | Molin et al. | 210/603 |
| 4,659,472 | 4/1987 | Norlund et al. | 210/609 |
| 4,668,043 | 5/1987 | Molin et al. | 210/603 |
| 4,709,008 | 3/1978 | Manchak | 210/751 |
| 4,760,650 | 8/1988 | Theliander et al. | 34/35 |
| 4,779,528 | 10/1988 | Bruke | 100/117 |
| 4,781,842 | 11/1988 | Nicholson | 210/751 |
| 4,852,269 | 8/1989 | Glorioso | 34/11 |
| 4,902,431 | 2/1990 | Nicholson et al. | 210/751 |

OTHER PUBLICATIONS

Wallace & Tiernan, Paste-Type Lime-Slaking Systems, Sep. 1989.
Berman, Lime Stabilization/Pasteurization vs. Traditional Methods, Jun. 1989.
Westphal & Christensen, Lime Stabilization: Effectiveness of Two Process Modifications, Villanova University, Jun. 1982.
EPA, Process Design Manual for Sludge Treatment and Disposal, Sep. 1979.
Christensen, Lime Stabilization of Wastewater Sludges-An Assessment, Villanova University, Mar. 1981.
Westphal & Christensen, Lime Stabilization: Effectiveness of Two Process Modifications, Nov. 1983.

*Primary Examiner*—Stanley S. Silverman
*Assistant Examiner*—Neil M. McCarthy
*Attorney, Agent, or Firm*—Paul & Paul

[57] ABSTRACT

A process for pathogen reduction in waste where dewatered sludge having a solids content in the range of 10–60% is mixed with an additive selected from the group consisting of calcium oxide or calcium carbonate group. Hydration to calcium hydroxide occurs with an attendant release of heat. The pH of the sludge is then elevated and the heat of the hydration reaction is retained resulting in effective neutralization of pathogens.

1 Claim, 1 Drawing Sheet

U.S. Patent
July 20, 1993
5,229,011
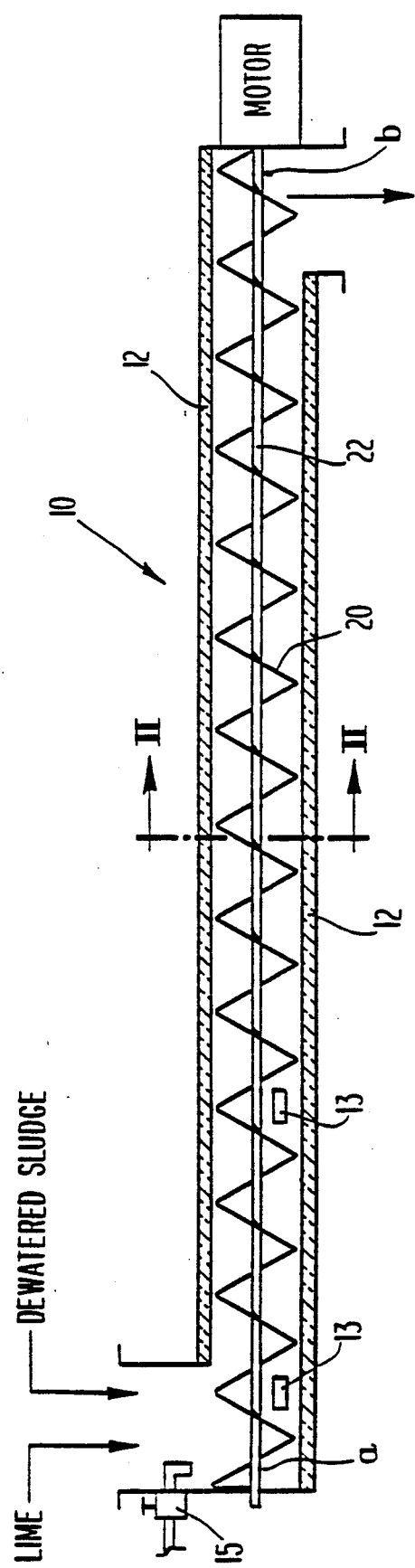
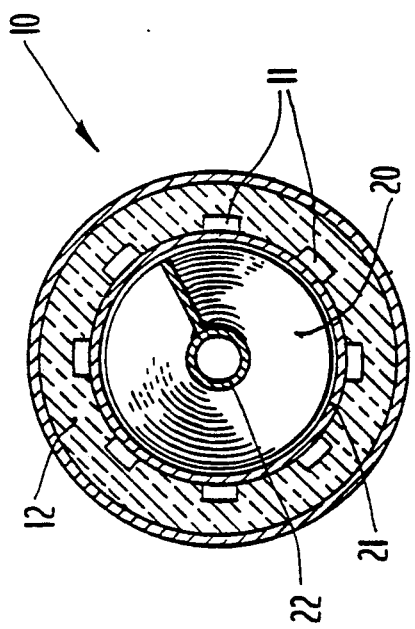

PROCESS FOR PATHOGEN REDUCTION IN WASTE

CROSS-REFERENCE TO RELATED APPLICATIONS

This application is a continuation of Ser. No. 07/654,789, filed on Feb. 13, 1991, which, in turn, is a continuation of Ser. No. 07/505,938, filed on Apr. 6, 1990, which is now U.S. Pat. No. 5,013,458, issued May 7, 1991.

FIELD OF INVENTION

The present invention generally relates to a process for the treatment of waste prior to disposal.

BACKGROUND OF THE INVENTION

The safe and sanitary disposal of waste is an ages old problem. Untreated waste, both in solid and liquid form, may contain any number of substances noxious to humans and the environment, including particulate solids, organic and inorganic compounds and pathogens.

It is desirable, therefore, to treat the waste before disposal. The treatment of the waste to destroy pathogens can be accomplished by a number of methods.

One method to treat waste to kill pathogens is to heat it to a high temperature for a period of time. Commonly known as pasteurization, this process neutralizes pathogens to a degree dependent upon the level of temperature and length of time that the waste is exposed to the elevated level.

Pasteurization, while effective to neutralize pathogens, may not reduce the odors emanating from the waste and may not reduce vector attractiveness. In the absence of reduction of vector attractiveness, vectors such as rats, mice and flies, will be attracted to the untreated waste. Vectors pose a health risk by themselves, as well as potentially spreading any pathogens present in the waste. Therefore, any treatment and subsequent disposal must reduce odors and attendant vector attractiveness factors.

One method to reduce vector attractiveness and also neutralize pathogens is by lime stabilization, which elevates the pH of the waste to a sufficient degree, for a sufficient period of time. This method is usually accomplished by the addition of an alkaline substance to the waste. Substances such as calcium oxide or calcium carbonate and compounds consisting of or containing them such as lime or quicklime, lime kiln dust, cement kiln dust, or dolomitic lime are commonly used for this process. The relatively low expense of sufficient quantities of these materials and their high alkalinity makes them well suited to the task.

In addition to the noxious components potentially present in and possible vector attraction to untreated waste, a further disposal problem is presented by the fact that untreated waste rarely is purely solid. Rather it usually has both solid and liquid components, with the solid component further potentially containing some degree of bound liquid, usually water. Thus the percent of liquid in the waste may be a sum of both the free liquid component as well as the liquid bound to the solid component. Due to these presence of both these components, waste may vary from a liquid type consistency and appearance to a thick solid consistency and appearance. The need to deal with this variety of phases complicates treatment and disposal. For example, if the waste has mostly a liquid type consistency, the majority of the free liquid portion of waste is separated out and dealt with through techniques known in the art. The remaining solid portion, or sludge, includes the remaining free liquid water, any bound water and the solid. That sludge, which may have a solids content of from 1 to 4%, then undergoes a further dewatering step by any of a number of processes known in the art. If the waste is of a more solid consistency, then the dewatering is usually done is a single process.

After the waste has been dewatered sufficiently, it is referred to as dewatered sludge, which may have a solids content of anywhere from approximately 10% to 60% with the remainder water. This dewatered sludge is difficult to handle. The varying solids content and percentage of water as bound and free give the sludge physical characteristics ranging from a viscous, colloidal liquid to a dry cake or clay.

The Environmental Protective Agency (EPA) has promulgated regulations for proper treatment and disposal of waste or sludge. To ensure neutralization of pathogens to what it deems an environmentally safe level, the EPA has currently imposed two statutorily defined levels of processes for disposal of waste: Processes to Significantly Reduce Pathogens (PSRP); and, Processes to Further Reduce Pathogens (PFRP). The use of either or both PSRP and PFRP depends upon the use to which the treated waste is to be put. Currently, PFRP result in a greater degree of pathogen reduction, and waste treated by PFRP has less restriction surrounding its disposal. Although PSRP and PFRP as currently promulgated in Appendix II to 40 CFR 257 are limited to a few named processes, it is possible to qualify a process for either level by meeting, inter alia, the statutorily defined reduction in pathogens.

U.S. Pat. No. 4,781,842 discloses such an invention. Although the process set forth therein is not named as a PSRP or PFRP specifically in Appendix II 40 CFR 257, the process achieves pathogen reduction to current PFRP mandated levels. It does so by mixing the waste with lime or a lime mixture sufficient to raise the pH to 12 for at least a day, and then drying the lime waste mixture, by a natural or aeration process, for a period of time sufficient to reduce pathogens to the current PFRP regulations set forth in that patent.

The disclosure in the '842 patent is limited to current levels of pathogen reduction necessary to achieve PFRP, however. Changing regulations may lead to changing levels of pathogen reduction and the '842 patent does not seem to be easily adaptable to such a circumstance.

Accordingly, it is an object of the present invention to provide an apparatus and method to achieve currently mandated levels of PSRP and PFRP.

It is a further object of the present invention to provide a apparatus and method to achieve different levels than current regulations mandate of pathogen reduction in waste.

It is a further object of the present invention to provide a method and apparatus to achieve effective neutralization of pathogens in waste.

A further object is to provide an apparatus capable of both stabilizing and pasteurizing raw sludge in a low cost, time-efficient manner.

SUMMARY OF THE INVENTION

According to the present invention, a sufficient quantity of lime is added to dewatered sludge, to raise the pH to a predetermined level and for a predetermined period of time in order to neutralize pathogens present in the sludge and reduce vector attractiveness. Furthermore, the heat of the lime-sludge reaction is retained and a measure of additional heat may be added, so that the temperature of the lime-sludge mixture is raised to a predetermined level for a predetermined period of time for further neutralization of pathogens.

Apparatus for performing the method is also disclosed.

BRIEF DESCRIPTION OF THE DRAWINGS

FIG. 1 is a schematic illustration, in side elevation, of a preferred apparatus embodying the invention.

FIG. 2 is a fragmentary section through FIG. 1.

DESCRIPTION OF THE PREFERRED EMBODIMENTS

In the preferred embodiment, dewatered sludge and an additive, usually lime, are deposited in a continuous stream to a chamber. They are thoroughly mixed when deposited, so the pH of the sludge begins to rise, stabilizing at or above the desired level which in the preferred embodiment is a pH of at least about 12. The process is then continued for the desired dwell time which is at least about two and a half hours and the pH level is monitored at about two hours to ensure it is maintained at about or above the desired level. The temperature is maintained at at least about 70° C. for the final half hour.

The mixing of the sludge and lime, at atmospheric conditions, leads to a hydration reaction:

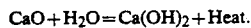

Using stoichiometric quantities in the reaction gives:

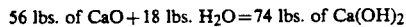

as well as releasing 27,500 BTU's per pound mole.

Although lime (defined here as substantially pure calcium oxide) is utilized in this embodiment, other substances consisting of or containing calcium oxide or calcium carbonate may be used, such as quicklime, dolomitic lime, or lime kiln dust cement kiln dust. Therefore, although lime is used herein, the additive is selected from the group comprising or consisting of calcium oxide and calcium carbonate. The selection may be dependant on availability and pH level desired, because some members of the group may not be effective enough to raise the pH to the desired predetermined level. For example, if the desired predetermined pH level is twelve, dolomitic lime may not be volatile enough to raise the mixture to that level.

The dewatered sludge may contain anywhere from 10–60% of dry solids, although 15–50% is more usual. The lime-sludge ratio, by weight, can vary from 25% to 200%, so that for every pound of dry solids of sludge, from 0.25 to 2.0 pounds of lime may be added. As this equation shows, the hydration of the lime requires water. The free (and perhaps some or all of the bound) water in the dewatered sludge is utilized in the reaction.

The resultant hydroxide, which in this embodiment is $Ca(OH)_2$, is the alkali utilized to elevate the pH of the sludge, and so cause lime stabilization. Elevation of the pH occurs quickly, and the sludge then remains at or above a predetermined level for a predetermined period of time. In the preferred embodiment the pH rises quickly to above 12. At about two hours the sludge is withdrawn and is tested to ensure it is at least about 12.

The predetermined period of time that the sludge dwells in the chamber is, in the preferred embodiment, at least two and a half hours during which, for the first about two hours, the sludge is at or above a pH of about 12. However, it should be noted that the dwell time is able to be shortened or lengthened. It can be as long as a number of days, or even weeks, depending on the degree of lime stabilization desired. The longer the dwell time, the greater the degree of stabilization. Additionally, the desired pH level may decrease over time, so that, for example, during a 24 hour dwell time, a pH of greater than or about 12 may be reached after 2 hours, and then, after 22 more hours, the pH may decline to at least about 11.5. The dwell time may also be shortened to be less than the two and one half hours. The lime may then be transferred another container or location. In an alternative preferred embodiment, the pasteurization is deemed to occur contemporaneously with the lime stabilization, and the dwell time is about thirty minutes. The pH is monitored at the end of two hours after initial mixing of the lime and sludge to ensure that it has remained at about or above 12. The temperature would be monitored for the initial at least about a half hour, to ensure it remains at about or above the desired 70° C. A further alternative is to monitor the temperature during the desired half hour pasteurization period at any time during the two hour time of lime stabilization.

In the first preferred embodiment having a two and one half hour dwell time, the sludge is exposed, after the two hour lime stabilization, for at least a half hour more to the elevated temperature of the chamber, caused by the heat released from the reaction and retained in the chamber. The chamber itself is substantially closed, which assists in retaining in the sludge at least a substantial amount of the heat released during the hydration reaction.

Although the preferred embodiment utilizes a single chamber to retain the sludge during pasteurization and lime stabilization, it is possible to have the steps occur in separate chambers and have the sludge pass through to each. It is also possible for the process to occur without any enclosure in a chamber, or partial enclosure during the process, as long as heat from the hydration reaction is retained within the sludge.

In the preferred embodiment enough heat is retained in the sludge during the course of the ongoing hydration reaction to maintain a temperature of at least about 70 degrees Celsius for at least 30 minutes and thereby pasteurize the sludge. It is also preferred to insulate the chamber to retain the heat in order to effect efficient pasteurization as well as increase the reaction rate. An increase in the temperature of 10° Celsius, for example, may double the reaction rate. A doubled reaction rate provides for increased heat and therefore temperature which in turn provides itself for a potentially further increase in temperature and as a result, further increase in reaction rate. This is a "snowball" or "avalanche" effect. If the heat is not released from the reaction in sufficient quantities to enable the sludge to reach the desired temperature, supplemental heat may be added.

The addition of supplemental heat may also be necessary because although a substantial amount of heat is released during the hydration reaction, excess water in the chamber may absorb the heat. It may be possible to bleed off or release some of the excess water, or use it in slaking the lime (which usually requires three parts water to one part lime), but the amount remaining may still absorb undesirable quantities of heat. For example, if 0.25 pound lime is added to every 1 pound sludge, and the sludge used has 15% solids content, then approximately 252 pounds of water will be released from the sludge during the reaction of stoichiometric quantities of lime and sludge. Insofar as 27,500 BTU's per pound mole are released during the reaction, the excess water will potentially absorb much of the heat released. Therefore, supplemental heat may be desirably added by controllable means. Note that, if the means are not controlled, due to the varying nature of the components, heat far in excess of that needed may be produced. For example, assuming that 2 pounds of lime are added to every 1 pound of sludge (in a 2:1 ratio) and the sludge utilized has 50% solids content, then only 18.5 pounds of water will be released by the sludge. This is barely enough for the hydration reaction to occur, and will lead to almost the entire 27,500 BTU's released in the reaction being utilized to heat the mixture. In this instance, little, if any supplemental heat may be necessary to reach desired or pasteurization temperature.

Because in the preferred embodiment the reaction is an ongoing one, operating continuously, sludge is introduced into the chamber where mixing occurs in a continuous stream, on a first-in, first-out basis, so that the beginning of the continuous stream introduced into the chamber is also the first to leave the chamber, after it has spent the desired dwell time in the chamber. This continuous stream may contain varying degrees of dewatered sludge, within 10-60% solids content range. As the sludge dwells in the chamber, monitoring the pH and the temperature of the sludge is desirable to ensure that the predetermined levels of pH and temperature are achieved and maintained during the dwell time in the chamber. If the levels are not achieved or maintained, additional lime may be added to raise the heat and temperature through hydration. If necessary, additional water can also be added, if insufficient amounts are present in the sludge. Also, supplemental heat may of course be applied to the sludge.

In the preferred embodiment the mixing of the sludge and lime may be continuously occurring throughout the sludge's dwell time. However, it is also possible to initially mix the lime and sludge when first introduced, in order for hydration of the lime to occur with the attendant release of heat, and then let the mixture dwell without further mixing, for the remainder of the desired dwell time. In such an embodiment, the remainder of the process is the same, and the pH and temperature can be monitored at appropriate times to ensure that they stay at the desired levels.

In the preferred embodiment, the sludge is also preheated before being mixed with the lime. This preheating, which could potentially be of the lime as well, allows the reaction to occur more efficiently, because less released heat from the hydration reaction is then necessary to be utilized to achieve the desired temperatures. Additionally, the availability of additional heat provides the ongoing "snowball" type of reaction discussed earlier.

It is important to note that the heterogeneous character of sludge, as well as the variables in the lime utilized, for example the purity, may lead to some variation in the stoichiometric equation and therefore the reaction. Also, the rate at which the reaction occurs is dependent upon a number of factors. For example, preheating of the lime or sludge, before they are dumped in the chamber, will lessen the heat necessary to reach the preferred 70° C. temperature. Also, the particle size of the utilized lime will also affect the rate of hydration as well as the rate of pH change. A very fine (pulverized) lime will materially improve the hydration rate. Yet the storage and feeding of a very fine lime is more difficult than a grosser composition.

At FIG. 1 is shown an apparatus embodying a preferred embodiment of the invention. Lime and dewatered sludge are dumped into the substantially closed chamber 10. The chamber 10 is a mixer, of the type known in the art, having an elongate generally helically shaped screw 20 driven by a motor. The screw 20 is retained within a generally cylindrical housing which serves as a chamber and as a mixer as well. It is also possible to use any other form of conveyor known in the art as long as mixing occurs. For example, a flight screw conveyor, a hollow flight conveyor or a helical conveyor all may be used and the number of actual screws may vary. Two or more within the same chamber may be used.

As the lime and sludge travel from point a to point b they are mixed continuously. The hydration reaction occurs upon mixing and at least a substantial amount of the heat released during the reaction is retained within the sludge. Use of the screw conveyor also permits treatment of the sludge on the preferred first-in, first-out basis. Additionally, use of a screw conveyor permits the desired dwell time, or the time required for the sludge to travel from point a to point b to be easily set, by merely adjusting the speed of the screw. Furthermore, supplemental heating of the sludge, if desired, is easily done as shown at FIG. 2. Heat elements, which provide supplemental heat to the sludge, are shown generally at 11 are placed around the conveyor shell 21. Insulation 12 is then wrapped around the heat elements 11. The heat elements 11, of a type known in the art, run the entire length of the conveyor 10 in a manner shown. This permits heating of the sludge during its travel through the conveyor. The insulation 12 also of a type known in the art, runs the entire length of the conveyor as well. The insulation 12 and heat elements 11 may be desirably combined in a unit or heat jacket for ease of assembly. The insulation 12 may also, in an embodiment not shown herein, be located on and run the entire length of the conveyor without any supplemental heat source.

Alternately, although this is not shown, the screws 20 of the conveyor on the shaft 22 on which they are carried can be hollow, and steam, hot air or hot water could be transported therethrough for a supplemental heat source.

Returning to FIG. 1, the monitors 13 serve to monitor the temperature to ensure that the desired, predetermined level of temperature is maintained. They may be placed wherever monitoring is desired. The monitors are any sort of thermometer known in the art including a tracking thermometer to view the temperature over time.

The pH may also be monitored during the dwell time of the sludge mixture. In the preferred embodiment, the monitoring is accomplished by withdrawal of a sample of sludge from the conveyor, from an access port (not shown), after about two hours. The sample is tested by a conventional type of pH sensor or meter known in the art to ensure it is at or above the desired level of about 12.

A spigot 15 is also shown, which permits the addition of additional water if desired for the reaction. Spigots may be located throughout the conveyor if desired, in a manner not shown here.

The above description and the view depicted by the Figure are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the appended claims.

We claim:

1. A process for treatment of sludge, which comprises:

(a) mixing dewatered sludge having a solids content in the range of 10–60% with an additive selected from the group consisting of calcium oxide and calcium carbonate to generate and release heat, with said additive present in sufficient quantity to adjust the pH of the sludge to at least a predetermined level of about 12, including the step of maintaining the predetermined pH level of the sludge for at least about 12 hours;

(b) retaining within the sludge at least a substantial amount of the heat released during step (a) above by maintaining the sludge in a substantially closed chamber at an elevated temperature for a predetermined period of time; and (c) including the step of applying supplemental heat to the sludge.

* * * * *

UNITED STATES PATENT AND TRADEMARK OFFICE
CERTIFICATE OF CORRECTION

PATENT NO. : 5,229,011
DATED : July 20, 1993
INVENTOR(S) : Robert W. Christy, Sr. et al.

It is certified that error appears in the above-indentified patent and that said Letters Patent is hereby corrected as shown below:

Column 8, line 9, change "12" to -- 2 --.

Signed and Sealed this

Thirteenth Day of December, 1994

Attest:

BRUCE LEHMAN

Attesting Officer   Commissioner of Patents and Trademarks